(12) United States Patent
Kim

(10) Patent No.: US 6,734,917 B2
(45) Date of Patent: May 11, 2004

(54) TELEVISION CAPTION DATA AND METHOD FOR COMPOSING TELEVISION CAPTION DATA

(75) Inventor: Myung Ja Kim, Kyonggi-do (KR)

(73) Assignee: LG Electronics, Inc., Seoul (KR)

( * ) Notice: Subject to any disclaimer, the term of this patent is extended or adjusted under 35 U.S.C. 154(b) by 497 days.

(21) Appl. No.: 09/745,551

(22) Filed: Dec. 26, 2000

(65) Prior Publication Data

US 2001/0040640 A1 Nov. 15, 2001

(30) Foreign Application Priority Data

Jan. 17, 2000 (KR) ........................................ 2000-2064

(51) Int. Cl.$^7$ ............................ H04N 11/00; H04N 7/00
(52) U.S. Cl. ...................... 348/461; 348/465; 348/467; 348/468
(58) Field of Search ................................. 348/460, 461, 348/464, 465, 467, 468; 375/240.25, 240.26, 240.28; 370/472, 473, 474, 476, 241, 252; H04N 11/00, 7/00

(56) References Cited

U.S. PATENT DOCUMENTS

| 5,510,849 A | * | 4/1996 | Han .............................. 348/569 |
| 5,659,368 A | * | 8/1997 | Landis ......................... 348/467 |
| 6,262,775 B1 | * | 7/2001 | Kim ............................. 348/465 |
| 6,477,185 B1 | * | 11/2002 | Komi et al. .................. 348/472 |
| 6,515,715 B1 | * | 2/2003 | Essen et al. .................. 348/714 |
| 6,570,926 B1 | * | 5/2003 | Agrawal et al. ........ 375/240.27 |

* cited by examiner

*Primary Examiner*—John Miller
*Assistant Examiner*—Trang U. Tran
(74) *Attorney, Agent, or Firm*—Birch, Stewart, Kolasch & Birch, LLP

(57) ABSTRACT

A television caption data and a method for generating the TV caption data are disclosed. In the present invention, before a caption information is input to a packet, the size of a block remaining in the packet is compared with the size of the caption information. If the size of the block is larger than the size of the caption information, the caption information is input to the remaining block of the packet. Otherwise, the caption information is input into a following packet which does have a size of a remaining block larger than the size of the caption information.

19 Claims, 4 Drawing Sheets

FIG.2

| | command | parm1 | parm2 | parm3 | parm4 | parm5 | parm6 |
|---|---|---|---|---|---|---|---|
| $b_0$ | $id_0$ | $P_0$ | $av_0$ | $ah_0$ | $rc_0$ | $cc_0$ | $ps_0$ |
| $b_1$ | $id_1$ | $P_1$ | $av_1$ | $ah_1$ | $rc_1$ | $cc_1$ | $ps_1$ |
| $b_2$ | $id_2$ | $P_2$ | $av_2$ | $ah_2$ | $rc_2$ | $cc_2$ | $ps_2$ |
| $b_3$ | 1 | cl | $av_4$ | $ah_3$ | $rc_3$ | $cc_3$ | $ws_0$ |
| $b_4$ | 1 | rl | $av_5$ | $ah_4$ | $ap_0$ | $cc_4$ | $ws_1$ |
| $b_5$ | 0 | v | $av_6$ | $ah_5$ | $ap_1$ | $cc_5$ | $ws_2$ |
| $b_6$ | 0 | 0 | $av_7$ | $ah_6$ | $ap_2$ | 0 | 0 |
| $b_7$ | 0 | rp | $ah_7$ | $ap_3$ | 0 | 0 | |

| 1 | 0 | 0 | 0 | 1 | 0 | 0 | 1 | Command |
|---|---|---|---|---|---|---|---|---------|
| $W_7$ | $W_6$ | $W_5$ | $W_4$ | $W_3$ | $W_2$ | $W_1$ | $W_0$ | para1 |

TELEVISION CAPTION DATA AND METHOD FOR COMPOSING TELEVISION CAPTION DATA

BACKGROUND OF THE INVENTION

1. Field of the Invention

The present invention relates to a television and more particularly, to a method for composing television caption data.

2. Discussion of the Related Art

Digital broadcastings are currently being transmitted and tested on televisions using ground waves. Accordingly, digital television (DTV) receivers have been developed and are continuously being improved to provide digital broadcasting to viewers. Compared to an analog TV receiver, a DTV receiver allows a larger screen, a higher resolution, and a faster data transmission.

Digital broadcasting data generally includes video data, audio data, and caption data. Here, the caption data with the latest technology in DTV broadcasting systems provide a wider service than the NTSC broadcasting systems of analog TVs. Particularly, digital television closed captions (DTVCC) have a transmission rate ten times faster than the NTSC captions such that multiple languages can simultaneously be transmitted. A standard regulation on the DTVCC is disclosed in the Caption Standard EIA 708 A.

FIG. 1 shows a general packet structure of a TV caption data including the DTVCC data. Referring to FIG. 1, a packet 1 includes a packet header 11 and a packet body 12. The packet body 12 is organized into a plurality of service blocks 2~5, where each of the service blocks 2~5 respectively includes a service block header 13, 15, 17, or 19 and a service block data 14, 16, 18, or 20. Here, the different services may be captions in different languages or captions in a same language but with different levels of difficulty. Therefore, a packet may include a plurality of services.

Accordingly, the packet 1 in FIG. 1 includes four services 2~5 with numbers 1~4. Here, the packet 1 may transmit one or more of standard service numbers 1~6 and/or one or more of extended service numbers 7~63. A packet generally transmits a minimum of four services. Also, various information can be used as codes for caption information to provide caption services. In particular, caption commands and caption characters or symbols are typically used.

The caption commands includes information on how the caption services are to be displayed on the actual screen while the caption characters or symbols are the content to be displayed. As the appearance and content varies, the caption information may have different lengths. Generally, characters are represented with one byte and commands are represented with more than two bytes. Contents on corresponding codes are disclosed in a coding map in the Caption Standard EIA 708 A.

The caption information as described can be transmitted through two packets if, for example, the caption information of more than two bytes are transmitted through different service block data. For example, a first packet may include the caption command and the second packet may include the caption characters or symbols. In such case, if a user switches on the caption function when the second of the two packet is being transmitted, the second packet does not include information which links to the information in the first packet. Thus, a decoder of the receiver considers a portion of the caption information included in the second packet as a code of a new command. Moreover, the decoder considers the command included in the first packet as a code for a new and different command. Accordingly, data such as following parameters are incorrectly decoded and the receiver cannot properly provide a caption service.

SUMMARY OF THE INVENTION

An object of the present invention is to solve at least the problems and disadvantages of the related art.

Another object of the present invention is to provide a more efficient TV caption service.

A further object of the present invention is to provide caption data and method to reduce errors in a decoder of a TV receiver.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a method for generating TV caption data includes checking the amount of block data remaining in a first of two packets assigned for use as DTV caption data, when a caption information is to be input to the first packet; comparing the size of the remaining block in the first packet with the size of the caption information; inputting the caption information in the remaining block of the first packet and transmitting the caption information to a TV receiver, if the size of the caption information is smaller than the size of the remaining block of the first packet; and inputting the caption information to a second packet and transmitting the caption information to the TV receiver, if the size of the caption information is larger than the size of the remaining block of the first packet.

According to the present invention, if there are more than two packets for use as TV caption data, each packet would include the full caption information, independently from the other packets.

BRIEF DESCRIPTION OF THE DRAWING

The invention will be described in detail with reference to the following drawings in which like reference numerals refer to like elements wherein:

FIG. 2 shows a Define Window command and parameters in accordance with the present invention;

DETAILED DESCRIPTION OF THE INVENTION

Reference will now be made in detail to the present invention, examples of which are illustrated in the accompanying drawings. Generally, the present invention generates caption data which allows a decoder of a TV receiver to easily decode the caption data from any packet by transmitting a full caption information in one packet.

As described above, the caption information includes caption commands and caption contents, i.e. characters or symbols. Here, there are multiple types of caption commands, but for purposes of explanation, the present invention will be explained with reference to two types of caption commands.

First, a Define Window (DF) command defines a window to be generated based upon an identification (ID) which follows the DF command. A maximum of eight windows can be generated, where each window is assigned one of ID numbers 0~7. Particularly, depending on the sequence of windows to be generated, each window is assigned a code from DF0~DF7, namely from 0x98~0x9F, in sequence from the first to the last window to be generated. Here, the code 0x98 represents a window corresponding to ID number 0, and the code 0x9F represents a window corresponding to ID number 7.

Moreover, commands are followed by parameters values of the commands. The parameters will next be explained in detail.

Parameter windowID (id) indicates the ID (0–7), parameter priority (p) indicates the priority sequence (0–7) of the windows, parameter anchor point (ap) indicates a position of an anchor (0–8), parameter anchor vertical (av) indicates the vertical position of a window anchor, parameter anchor horizontal (ah) indicates the horizontal position of the window anchor, parameter row count (rc) indicates a number of characters that can fit on a window vertically, parameter column count (cc) indicates a number of characters that can be fit on a window horizontally, parameter row lock (rl) indicates whether the vertical length of a window is set by a caption information provider, parameter column lock (cl) indicates whether the horizontal length of a window is set by a caption information provider, parameter visible (v) indicates whether a generated window is to be displayed on the screen, parameter window style ID (ws) indicates the window style to be used among preset window styles, and parameter pen style ID (ps) indicates the pen style to be used among preset pen styles.

Figure 1:
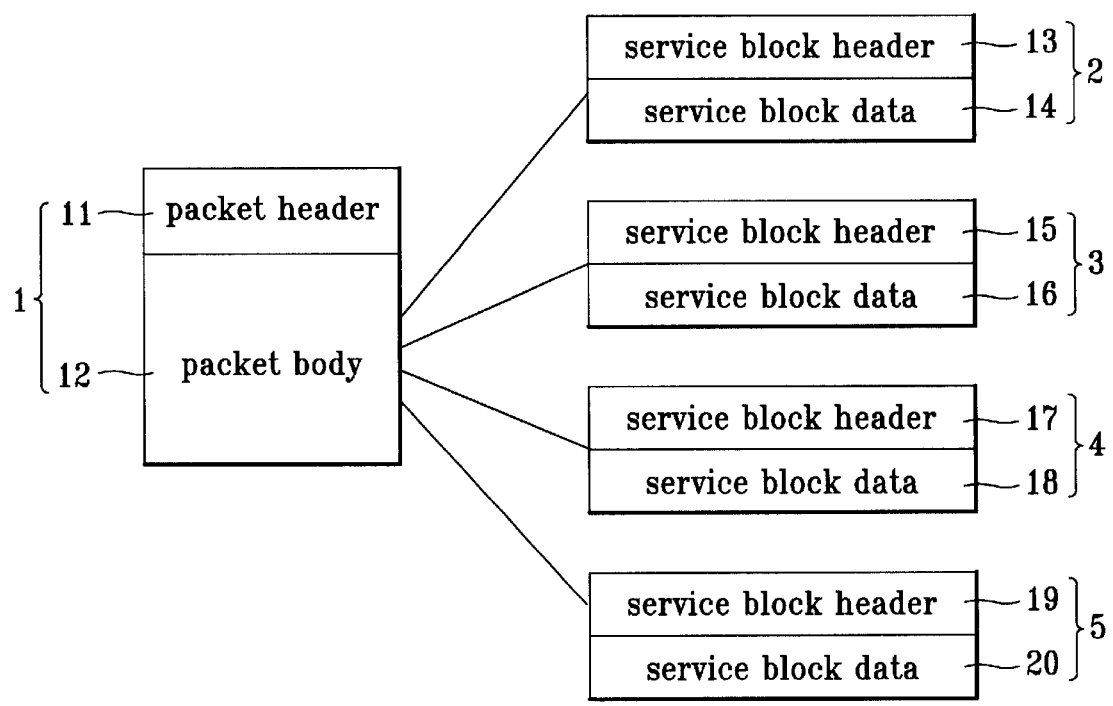
FIG. 1 shows a structure of a general packet structure in the related art.
Figures 3, 4:
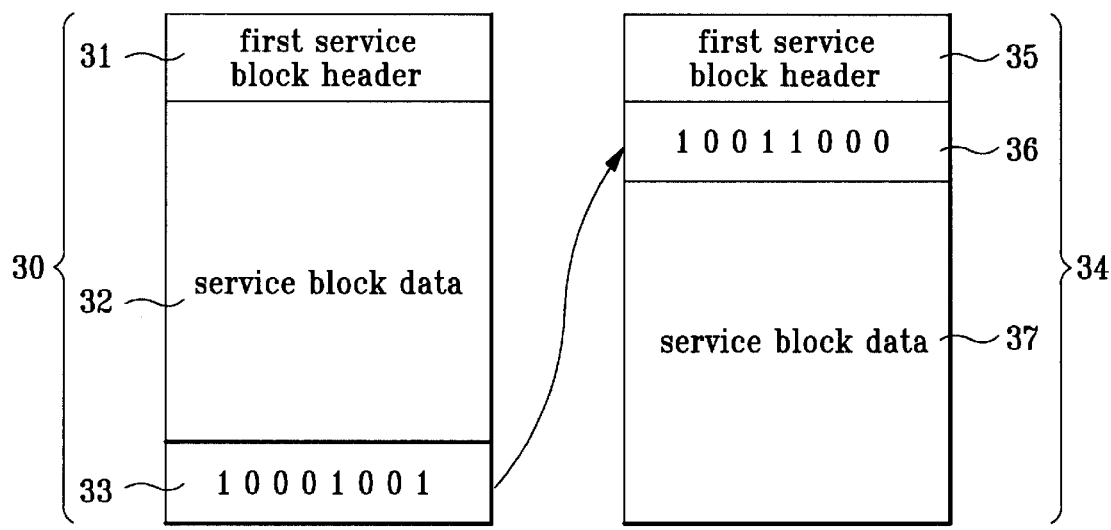
FIG. 3 shows a DSW and the first parameter of the DSW command in accordance with the present invention.
FIG. 4 shows a TV caption data structure in the related art.

FIG. 2 shows a block diagram of DF commands with the parameters. Assume then that a command that indicates which window, from among eight windows, is to be displayed on a screen is a Display Window (DSW) command. FIG. 3 shows the DSW command and a first parameter of the DSW command.

In DTVCC, windows are generated on the screen and caption information is displayed on the windows. As described above, a maximum of eight windows can simultaneously be displayed on the screen, where each window is distinguished by ID numbers 0~7. The DSW command indicates the ID corresponding to the window which is to be displayed on the screen among the eight windows. Accordingly, the DSW command is generally represented by two bytes. The first byte is a code "0x89" indicating the command "DSW" and the second byte is a bit value indicating an ID corresponding to the window to be displayed.

For example, if windows corresponding to ID numbers 3, 4, and 7 are to be simultaneously displayed on the screen, the corresponding bit value would be "10011000" with a code of "0x98".

Figure 5:
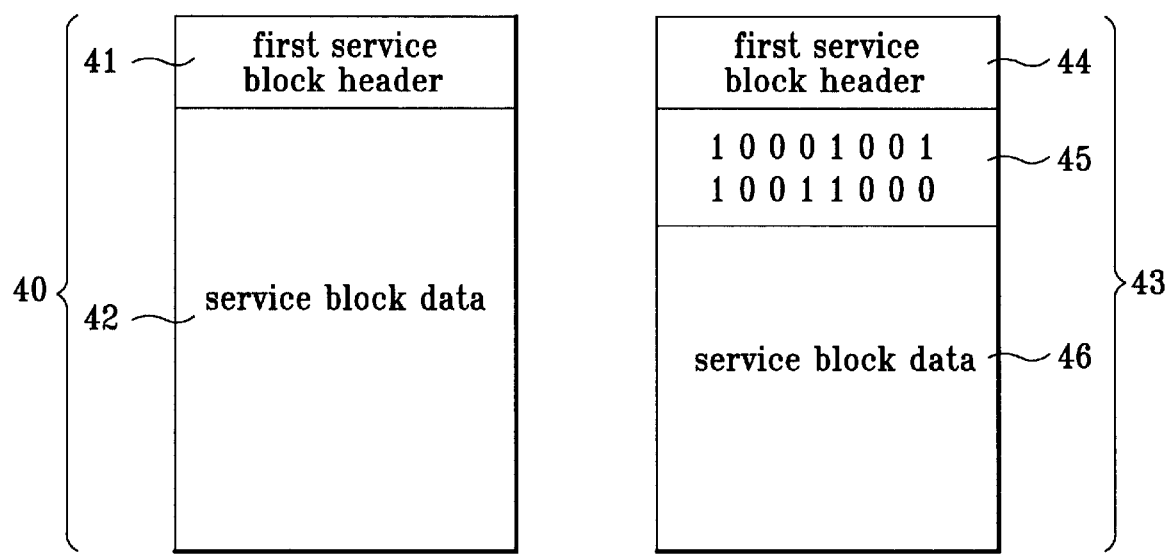
FIG. 5 shows a TV caption data structure according to the present invention.

The method of generating TV caption data will next be described with reference to FIGS. 4 and 5, wherein FIG. 4 shows a TV caption data structure of two packets which separately includes a caption information and FIG. 5 shows a TV caption data structure according to the present invention.

Referring to FIG. 4, commands such as DF and DSW commands are typically transmitted through packets 30 and 34 respectively including first service block headers 31 and 35, and service block data 32 and 37. Assume then that a DSW command 33 is input in the service block data 32 of the first packet 30 and a first parameter 36 of the DSW command 33 is input in the service block 37 of the second packet 34 following the first packet 30. If the packets 30 and 34 are transmitted to a TV receiver and a user turns off and on the caption function, the TV receiver may first process caption data from the second packet 34.

In such case, a decoder of the TV receiver would read the code of the first parameter 36 which is "0x98." Accordingly, the decoder would search for information corresponding to the code "0x98" from a code map and decode according to the searched information. As the code "0x98" corresponds to a DF0 command, the command defines the 0th window. Thus, the decoder incorrectly reads a second byte representing the DSW command as the DF0 command DF0.

As a result, DTV caption information generated with more than two bytes should be prevented from being input in different packets. In other words, an encoder of a broadcaster that transmits the caption information must generate the caption information not to be transmitted through different packets. Accordingly, the present method for generating a TV caption data will be explained next with reference to FIG. 5.

FIG. 5 shows packets 40 and 43 respectively including first service block headers 41 and 44, and service block data 42 and 46. When an encoder is used to transmit caption information through the first packet 40, the size of the caption information to be input is compared with the size of service block data remaining in the first packet 40. If the size of the caption information is larger than the size of the service block data remaining in the first packet 40, the caption information is not input in the first packet 40 but input in the second packet 43 following the first packet 40.

Otherwise, if the size of the caption information is smaller than or equal to the size of the service block data remaining in the first packet 40, the caption information is input in the service block data remaining in the first packet 40. Here, the caption information includes, not only the command, but also the parameters of the command.

In addition, before inputting the caption information in the second packet 43, if the caption information is larger than the service block data remaining in the second packet 43, the caption information is not input in the second packet 40. Such comparison is repeated until a packet in which the size of the remaining service block data is larger than the size of the caption information is located. Thereafter, the full caption information is input in the located packet.

Thus, rather than dividing the caption information according to a length of the service block data remaining in a packet, the present invention transmits the full caption information in one packet.

Particularly, FIG. 5 shows a caption data structure in which the DSW command and the first parameter are input in the second packet 43. As shown, TV caption data according to the present invention typically includes more than two packets. However, each packet includes, if any, the full caption information which is independent from other packets. That is, one caption information is not input and dispersed into more than one packet.

According to the present TV caption data and method for generating the TV caption data, the encoder inputs the caption information in a single packet by comparing the size or length of a service block data remaining in a corresponding packet to determine whether there is sufficient space to input the caption information in the packet. If the space is determined to be insufficient, the caption information is input in a next packet which is determined to have sufficient space. Therefore, the decoder of a TV receiver may more efficiently decode the caption information.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for generating TV caption data comprising:
   (a) comparing the size of caption information to be input in a packet with the size of remaining block data in a first packet, wherein the caption information includes a caption command and at least one parameter corresponding to the caption command; and
   (b) inputting the caption information in the remaining block data of the first packet if the size of the caption information is equal to or smaller than the size of the remaining block data of the first packet; and otherwise
   (c) inputting the caption information in a second packet following the first packet.

2. The method of claim 1, wherein the caption information is represented by more than two bytes.

3. The method of claim 1, wherein (c) further comprises:
   comparing the size of the caption information with the size of remaining block data in the second packet; and
   inputting the caption information in the remaining block data of the second packet if the size of the caption information is equal to or smaller than the size of the remaining block data of the first packet; and otherwise
   comparing the size of the caption information with the size of remaining block data in a next packet until the remaining block data of the next packet is larger than the size of the caption information and inputting the caption information in the remaining block data of the next packet.

4. The method of claim 3, wherein the caption information is represented by more than two bytes.

5. The TV caption data structure generated by the method of claim 1.

6. The TV caption data structure of claim 5, wherein each packet includes a packet header and a packet body.

7. The TV caption data structure of claim 6, wherein each packet body includes a service block header and a service block data.

8. The TV caption data structure generated by the method of claim 3.

9. The TV caption data structure of claim 8, wherein each packet includes a packet header and a packet body.

10. The TV caption data structure of claim 9, wherein each packet body includes a service block header and a service block data.

11. The method of claim 1, wherein the caption command includes one of a Defined Window (DF) command and a Display Window (DSW) command.

12. The method of claim 1, wherein the at least one parameter includes at least one from the group of a window ID, a priority, an anchor point, an anchor vertical, an anchor horizontal, a row count, a column count, a row lock, a column lock, a visible, a window style ID and a pen style ID.

13. The method for generating TV caption data comprising:
   (a) comparing the size of caption information to be input with a size of remaining block data in a packet, wherein the caption information includes a caption command and at least one parameter corresponding to the caption command;
   (b) repeating (a) until a packet in which the size of the remaining block data is equal to or greater than the size of the caption information is found; and
   (c) inputting the caption information in the found packet.

14. The method of claim 13, wherein the caption information is represented by more than two bytes.

15. The TV caption data structure generated by the method of claim 13.

16. The TV caption data structure of claim 15, wherein each packet includes a packet header and a packet body.

17. The TV caption data structure of claim 16, wherein each packet body includes a service block header and a service block data.

18. The method of claim 13, wherein the caption command includes one of a Defined Window (DF) command and a Display Window (DSW) command.

19. The method of claim 13, wherein the at least one parameter includes at least one from the group of a window ID, a priority, an anchor point, an anchor vertical, an anchor horizontal, a row count, a column count, a row lock, a column lock, a visible, a window style ID and a pen style ID.

* * * * *